Oct. 6, 1942.              E. H. LAND                2,298,059
COLOR CORRECTION FILTER EMPLOYING LIGHT-POLARIZING MATERIAL
Filed Nov. 8, 1941
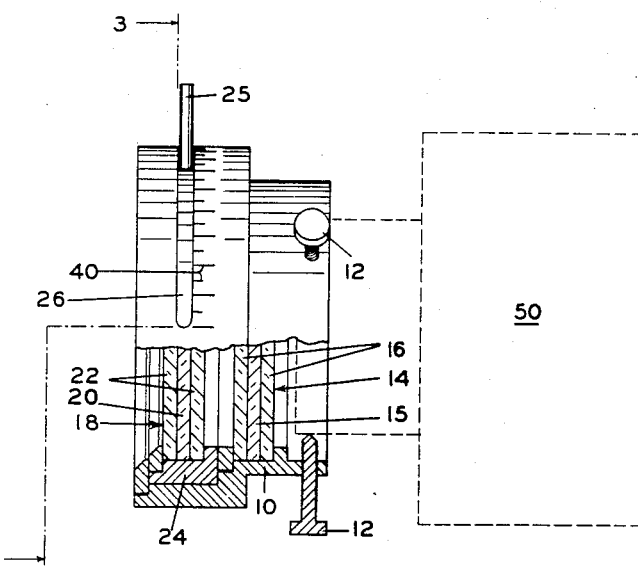
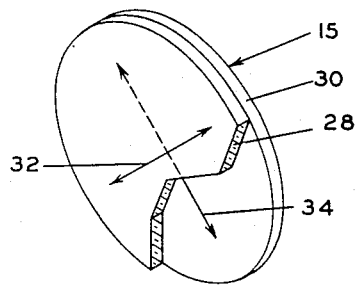
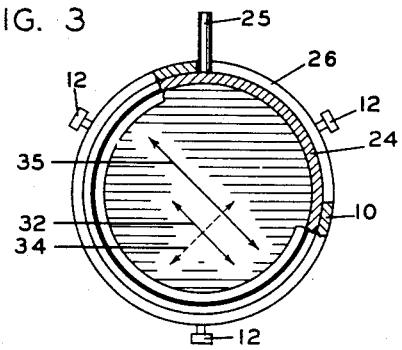
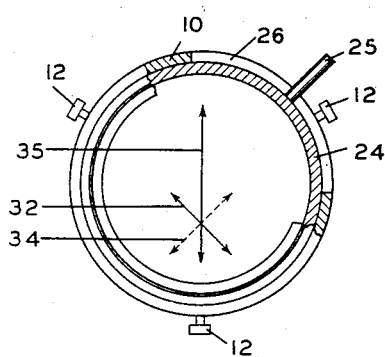
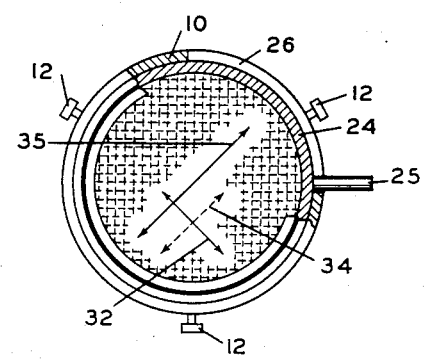
INVENTOR.
Edwin H. Land
BY
Donald L. Brown
Attorney

UNITED STATES PATENT OFFICE 2,298,059

COLOR CORRECTION FILTER EMPLOYING LIGHT-POLARIZING MATERIAL

Edwin H. Land, Cambridge, Mass., assignor to Polaroid Corporation, Dover, Del., a corporation of Delaware Application November 8, 1941, Serial No. 418,392

9 Claims. (Cl. 88—65)

This invention relates to light filters for photographic purposes, and is particularly concerned with light filters of the type used in connection with color film to control the amount of light of a particular color or colors entering the camera.

It is well known that the appearance of a colored object varies according to the kind of light by which it is viewed. That is to say, the apparent color of the object may be different according to the source of the light incident thereon, even though all said light may appear white to the eye. This is due to the fact that different sources of apparently white light tend to emit different relative proportions of color components making such light. The human eye, in general, possesses the power of compensating for some such variations in proportion and hence does not readily detect them except in so far as they affect the appearance of colored objects.

Photographic color film, however, does not possess this power of compensation, but on the contrary has a tendency to exaggerate the predominance of a particular color component in the light used to illuminate the object being photographed. Such film is commonly designed to give correct color rendering when exposed to light containing particular proportions of the different color components. If the light contains a preponderance of long waves, the picture will appear warm in tone or predominantly yellow. If, on the other hand, the light contains a preponderance of short waves, the picture will be bluish or cold in tone.

According to conventional photographic practice, this difficulty is overcome by using with color film, isotropic filters of relatively low density designed to reduce the relative amount of a preponderant color component in the light reaching the film from the object being photographed. Such filters are known as color correction filters and in general are light blue or light orange-brown in color, being designed to reduce the relative amount of light of long or short wave lengths respectively. They are of low density for the reason that they are intended merely to restore the proper balance of the different color components and hence absorb only a portion of the undesired component. It is obvious, however, that each is limited to a particular light condition, and hence that they must be exchanged to meet varying conditions of illumination.

It is a principal object of this invention to provide a color correction filter for the above purpose wherewith the desired degree of correction may be secured by adjustment within the filter.

Another object is to provide such a filter which may be attached to the camera and wherein the desired adjustment may be obtained without removal or exchange of the parts.

A further object is to provide such color correction means wherein the filter elements comprise dichroic polarizing material.

A still further object is to provide such a filter capable of correcting either predominantly yellow or predominantly blue light by simple adjustment without removal from the camera.

Other objects and advantages will in part appear and in part be pointed out in the course of the following description of one embodiment of the invention, which is given as a non-limiting example, in connection with the following drawing, in which:

Figure 1 is a view, partly in elevation and partly in section, showing a color correction filter embodying a form of the invention, said filter being indicated diagrammatically as mounted for operation on a suitable photosensitive device such as a color temperature meter or a camera;

Figure 2 is a perspective view, partly broken away, showing one of the light-polarizing elements used in the filter shown in Fig. 1; and Figures 3, 4 and 5 are sections on the line 3—3 in Fig. 1, illustrating somewhat diagrammatically the operation of the filter shown in Fig. 1.

Referring to Fig. 1, barrel 10 may be fitted in any suitable way, as for example by means of set screws 12, for attachment to a camera or color temperature meter such as is indicated at 50. Mounted within barrel 10 and preferably fixedly positioned therein is a filter element 14 comprising a light-polarizing layer 15 which may be laminated as shown between protective layers 16 of glass or other transparent plastic. Layer 15 comprises polarizing material of special characteristics which will be described in more detail hereinafter in connection with Fig. 2.

Rotatably mounted in barrel 10 in substantially parallel relation with element 14 is a second polarizing filter element 18 which may comprise, as shown, a central layer 20 laminated between protective layers 22 of glass or other transparent plastic and fixed in rim 24. Layer 20 preferably comprises polarizing material adapted to polarize substantially uniformly throughout the visible spectrum, and suitable materials for this purpose include polarizing films or sheets sold under the trade name "Polaroid." Element 18 is shown as provided with suitable means for controlling its rotation, comprising pin 25 threaded into rim 24 and passing through slot 26 in barrel 10. As shown in Figs. 3–5, slot 26 is preferably of just sufficient length to permit a 90° rotation of element 18.

In accordance with the practice of the invention, polarizing layer 15 preferably possesses such polarizing properties that it acts to absorb a portion of one component of light of a predetermined wave length band adjacent one end of the visible spectrum and a portion of the other component, i. e. light vibrating at right angles to the first named component, of light of a predetermined wave length band adjacent the other end of the visible spectrum. In other words, if a beam of white light is incident thereon, layer 15 may absorb a portion of light vibrating in one direction in one band of the spectrum, for example the red-yellow, and a portion of the light vibrating perpendicularly thereto in another band of the spectrum, for example the blue. The density of polarizing material in layer 15 for the absorbed components is preferably low, so that substantial portions thereof are freely transmitted.

Polarizing elements having such properties may be formed in a variety of ways. For example, referring to Fig. 2, layer 15 is shown as comprising a pair of component layers 28 and 30 which are each partial polarizers for different, predetermined wave length bands. For example, layer 28 may be a partial polarizer for light at the blue-violet end of the spectrum and may transmit light throughout the remainder of the spectrum in substantially unpolarized condition, and layer 30 may be a partial polarizer for light in the yellow or orange band of the spectrum and transmit other light in substantially unpolarized condition. The transmission axes of layers 28 and 30 are represented as being parallel respectively to arrows 32 and 34, and the two layers are preferably assembled in such manner that their transmission axes are substantially at right angles with each other.

Layers 28 and 30 may be formed of a variety of materials such, for example, as films or sheets of suitably dyed or stained plastic. Preferred materials for this purpose comprise plastics of the class consisting of transparent, linear high polymers the molecules of which contain hydroxyl groups, and examples thereof include polyvinyl alcohol, polyvinyl acetal and regenerated cellulose. Particularly good results have been obtained with polyvinyl alcohol, and layers 28 and 30 may advantageously comprise sheets of this material which have had the molecules therein oriented to substantial parallelism and the oriented portions of which have incorporated therein a dichroic dye or dyes of the desired color.

The term "dichroism" is used herein and in the claims as meaning the property of differential absorption of the components of an incident beam of light, depending upon the vibration directions of said components. By "dichroic" dye or stain is meant a dye or stain whose molecules possess the property of showing dichroism. In the practice of the invention this property is displayed when said dyes are incorporated in molecularly oriented plastic materials, in that the resulting stained areas show dichroism. For the purpose of the present invention said dyes are preferably chosen with a view to their ability to show high dichroism over a relatively narrow wave length band, and the dye used in one sheet will preferably show relatively little or no absorption for light of the wave length band absorbed by the dye used in the other said layer.

A preferred combination of dyes for use in polarizer 15 is blue and photographic yellow. For example, layer 28 may comprise a sheet of polyvinyl alcohol cast from a solution to which has been added a dichroic minus blue dye such, for example, as Erie Fast Brown 3RB. Layer 30 may similarly comprise a sheet of polyvinyl alcohol cast from a solution to which has been added a dichroic blue dye such as Niagara Sky Blue 6B. The amount of the dye used should be such that the density for the absorbed component of the resulting polarizer will not exceed and may be less than the density for both components of commercial isotropic color correction filters.

Sheets prepared in the above manner appear to show the best dichroism when the molecules therein are substantially completely oriented, as for example by stretching the sheet to six or seven times its cast length, but this is not essential, and adequate dichroism may be obtained with a stretch to only substantially twice its original length. The stretched sheets may then be assembled in superimposed relation with their respective directions of molecular orientation at right angles to each other, and they may be laminated together by any suitable adhesive such as a solution of polyvinyl alcohol. In considering the operation of such a polarizer, it should be borne in mind that layer 28 is a partial polarizer for light of relatively short wave lengths, by reason of the fact that it absorbs part of one component of such light but transmits both components throughout the remainder of the spectrum. Similarly layer 30 is a partial polarizer for light of relatively longer wave length, inasmuch as its density for the absorbed component is highest towards the yellow and red bands of the spectrum.

Figs. 3–5 illustrate somewhat diagrammatically the operation of the above described filter. In these figures arrow 35 represents the transmission axis of neutral polarizer or analyzer 20, and arrows 32 and 34 represent the directions of the transmission axes of yellow and blue polarizers 28 and 30 respectively. It will be noted that the three polarizers are preferably so positioned with respect to each other and to slot 26 that when pin 25 is at either end of said slot the transmission axis of analyzer 20 will be respectively parallel with and perpendicular to the transmission axes of the color polarizers.

In Fig. 3, element 18 is shown as having been rotated within barrel 10 to a position wherein pin 25 is at one end of slot 26, with the result that arrow 35 is substantially parallel with arrow 32 and therefore perpendicular to arrow 34. In this position the light transmitted by analyzer 20 to polarizer 15 will be freely transmitted by layer 28, inasmuch as said light will be vibrating parallel to its transmission axis, and layer 28 therefore takes no part in the operation of the device.

At the same time, the light transmitted by analyzer 20 to polarizer 15 is vibrating at right angles to the transmission axis of layer 30. Accordingly, layer 30 will absorb a part of the light of relatively long wave length, leaving the relatively shorter waves predominating and thus giving a bluish tinge to the light, as is indicated by the shading in Fig. 3.

In Fig. 4, element 18 is shown as having been rotated within barrel 10 until pin 25 is substantially equidistant from the ends of slot 26. In this position the transmission axis of polarizer 20 is at angles of substantially 45° with the transmission axes of yellow and blue polarizers 28 and 30. The latter will therefore absorb a small portion of the yellow and blue components of the light transmitted thereto from polarizer 20, but the remainder of said light will be freely transmitted. Since the amount of each color absorbed is substantially equal, there will be no appreciable effect on the color of the transmitted light, and it will accordingly be seen that this is the neutral position and that the transmitted light will have no predominant color.

In Fig. 5, element 18 is shown as having been rotated within barrel 10 until pin 25 is at the opposite end of slot 26 from the position shown in Fig. 3. In this position arrow 35 is substantially parallel with arrow 34 and therefore perpendicular to arrow 32, and the converse of the operation shown in Fig. 3 will take place. The yellow light transmitted by polarizer 20 will be freely transmitted by polarizer 15, but a portion of the blue component will be absorbed by layer 28, leaving the relatively longer waves predominating in the transmitted light and thus giving it a brownish yellow tinge, as is indicated by the shading in Fig. 5.

It will be seen from the foregoing that the filter of the invention is capable of providing the proper color correction for virtually any condition of illumination. The position shown in Fig. 3 would be the position used if the light illuminating the object to be photographed contained a preponderance of yellow, and the position shown in Fig. 5 is the position that would be used if the light illuminating the object to be photographed contained a preponderance of blue. Any desired variation between these two extremes may easily be compensated for by partial rotation of element 18, and the position shown in Fig. 4 is that proper for a condition of illumination by relatively pure white light.

The proper setting of the filter of the invention for a given condition of illumination may be determined in a variety of ways. For example, the filter may be removed from a camera and used in conjunction with a so-called color temperature meter such as is indicated at 50 in Fig. 1. That is to say, it may be combined with the meter and adjusted in conjunction therewith until the proper degree of correction is secured. It may then be set in that position, returned to its place on the camera, and utilized in taking the picture. This method has the advantage that it eliminates the necessity for taking a separate reading of the color conditions.

Another means of adjusting this filter involves the use of the Kelvin scale of color temperatures. For such use, the edge of slot 26 may be graduated in °K., as indicated at 40 in Fig. 1. Inasmuch as commercial color film is commonly sensitized to give correct color rendering when exposed to light in a color temperature of approximately 3200° K., this value would be at the midpoint in scale 40, the values rising towards the end of the slot as element 18 is rotated clockwise from the position shown in Fig. 4, and falling as it is rotated counterclockwise from said position. With such an arrangement it would simply be necessary to measure with a conventional color meter the color temperature of the given condition of illumination and set pin 25 opposite the value thus obtained, which will automatically give the proper degree of correction.

It may under some conditions be found desirable to use a partial neutral polarizer in element 18 instead of the complete neutral polarizer 20 described above. This is particularly true in cases where the intensity of illumination is not large, inasmuch as the loss of half the light resulting from complete polarization may prove disadvantageous. In this case, the densities of polarizers 28 and 30 should be correspondingly lowered, for the reason that when combined with a partial neutral polarizer, both will act to absorb some light. However, the layer crossed with the analyzer will absorb relatively more than the layer whose transmission axis is parallel with that of the analyzer.

Inasmuch as the relative amount of each color component which needs to be absorbed to secure proper correction is generally very small, it will be seen that the filter of the invention can be operated successfully even with very dilute polarizing layers. In general, therefore, it may be stated that the densities of said polarizers for the absorbed components should preferably not exceed the density for both components of commercial isotropic color correction filters, and in many cases substantially lower densities may be used.

It will be obvious that numerous changes may be made in the construction of the above described filter without departing from the scope of the invention. For example, the relative position of the two polarizers may be reversed so that element 14 is rotatable with respect to a fixedly positioned neutral polarizer. Alternatively, both polarizers may, if desired, be rotatable within barrel 10. Furthermore, polarizers for colors or wave length bands other than those described above may be substituted herein without changing any essential of the invention.

In the foregoing description, polarizers 28 and 30 are described as being cast from the solution to which the desired dye has been added. It is to be understood, however, that the dye may be incorporated into the sheet in a variety of other methods. For example, a cast sheet may be imbibed in a solution of the desired dye, and the orientation operation may take place either before or after the dyeing step. Alternatively, the dye may be applied to the oriented surface of a sheet of the desired plastic by saturating a suitable matrix with the dye solution and pressing it into contact with the oriented surface of the sheet. Various other ways of producing the desired result will doubtless be apparent to those skilled in the art.

Heretofore element 15 has been described as being in laminated form, but this is not an essential limitation. It may, for example, comprise a pair of separate polarizers 28 and 30 fixed in position within barrel 10 with their respective transmission axes relatively perpendicular. Alternatively, element 15 may comprise a single sheet of material such as polyvinyl alcohol which has the molecules on each surface oriented to substantial parallelism but in directions at right angles to each other. With a sheet so oriented, it is possible to dye one side one color, for example yellow, and the other side another color, for example blue, and the resulting product will be found substantially identical in operation and polarizing properties with laminated polarizer 15. It should be pointed out that in all these modifications it is essential only that the portions of the plastic penetrated by the dyes should have the molecules therein oriented, and it is of no importance whether or not the molecules of unstained portions of the sheet be oriented. It is to be understood, therefore, that whenever the products of the invention are specified in the following claims as being molecularly oriented, this term is to be interpreted as meaning that at least the dyed portions thereof are oriented.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A variable color light filter comprising, in combination, a dichroic, light-polarizing element adapted to absorb light of a predetermined wave length band less than the visible spectrum, a second dichroic, light-polarizing element adapted to absorb light of a predetermined wave length band less than the visible spectrum and different from the band polarized by said first named element, the density of each of said elements for the light component absorbed thereby being not greater than a predetermined maximum, said maximum being such that a substantial portion of said component is transmitted, barrel means providing a common mounting for said polarizing elements, said elements being mounted in substantially parallel relation with their respective transmission axes relatively perpendicular, a third polarizing element adapted to polarize substantially uniformly throughout the visible spectrum, and means for producing relative rotation between said third polarizing element and said first two polarizing elements.

2. A variable, color correction filter comprising, in combination, means providing a dichroic, light-polarizing layer adapted to absorb light of relatively short wave length to a greater extent than other light, means providing a second dichroic, light-polarizing layer adapted to absorb light of relatively long wave length to a greater extent that other light, the density of polarizing material in each of said polarizing layers being not greater than a predetermined maximum, said maximum being substantially no greater than the density for unpolarized light of a corresponding commercial isotropic color filter, barrel means providing a common mounting for said polarizing layer means, said polarizing layers being mounted with their respective transmission axes relatively perpendicular, means providing a third dichroic, light-polarizing layer adapted to absorb uniformly substantially all the visible light, and means for rotatably mounting said third polarizing layer means within said barrel in parallel relation with said first named polarizing layers.

3. A variable, color correction filter comprising, in combination, a dichroic, light-polarizing element adapted to absorb only light of relatively short wave length, a second dichroic, light-polarizing element adapted to absorb only light of relatively long wave length, the density of each of said elements for the light component absorbed thereby being not greater than a predetermined maximum, said maximum being substantially equal to the density for unpolarized light of corresponding commercial isotropic color filters, means for mounting said elements in substantially parallel relation with their respective transmission axes relatively perpendicular, a third dichroic, polarizing element adapted to polarize substantially uniformly throughout the visible spectrum, means for mounting said third polarizing element substantially overlying and parallel with said first named polarizing elements, and means for producing relative rotation between said third polarizing element and said first named polarizing elements.

4. A variable, color-correction filter comprising, in combination, a dichroic, light-polarizing element adapted to absorb light of relatively short wave length, a second dichroic, light-polarizing element adapted to absorb light of relatively long wave length, the density of each of said elements for the light component absorbed thereby being not greater than a predetermined maximum, said maximum being such that a substantial portion of said component is transmitted, barrel means providing a common mounting for said polarizing elements, said elements being mounted in substantially parallel relation with their respective transmission axes relatively perpendicular, a third polarizing element adapted to polarize substantially uniformly throughout the visible spectrum, said third polarizing element being mounted within said barrel in parallel relation with and substantially overlying said first named polarizing elements, and means for producing relative rotation between said third polarizing element and said first named polarizing elements.

5. A variable, color-correction filter comprising, in combination, a dichroic, light-polarizing element adapted to absorb light of relatively short wave length, a second dichroic, light-polarizing element adapted to absorb light of relatively long wave length, the density of each of said elements for the light component absorbed thereby being not greater than a predetermined maximum, said maximum being such that a substantial portion of said component is transmitted, barrel means providing a common mounting for said polarizing elements, said elements being mounted in substantially parallel relation with their respective transmission axes relatively perpendicular, a third polarizing element adapted to polarize substantially uniformly throughout the visible spectrum and comprising neutral dichroic material of a density substantially equal to that of said first named polarizing elements, said third polarizing element being mounted within said barrel in parallel relation with and substantially overlying said first named polarizing elements, and means for producing relative rotation between said third polarizing element and said first named polarizing elements.

6. A variable, color correction filter comprising, in combination, a light-polarizing element comprising a molecularly oriented sheet of a transparent, linear, high polymeric plastic the molecules of which contain hydroxyl groups, the direction of molecular orientation of one surface of said sheet being substantially perpendicular to that of the other said surface, one of said surfaces having incorporated therein a dichroic dye absorbing light of relatively short wave length to a greater extent than other light, the other of said surfaces having incorporated therein a dichroic dye absorbing light of relatively long wave length to a greater extent than other light, the density of each of said surfaces for the light component absorbed thereby being not greater than a predetermined maximum, said maximum being substantially equal to the density for unpolarized light of corresponding commercial isotropic color filters, a second polarizing element adapted to polarize substantially uniformly throughout the visible spectrum, means providing a common mounting for said elements, said elements being mounted in substantially parallel relation and substantially overlying each other, one of said elements being rotatably mounted with respect to the other said element, and means for rotating said rotatably mounted element.

7. A variable, color correction filter comprising, in combination, a light-polarizing element comprising a molecularly oriented sheet of polyvinyl alcohol, the direction of molecular orientation of one surface of said sheet being substantially perpendicular to that of the other said surface, one of said surfaces having incorporated therein a dichroic dye absorbing light of relatively short wave length to a greater extent than other light, the other of said surfaces having incorporated therein a dichroic dye absorbing light of relatively long wave length to a greater extent than other light, the density of each of said surfaces for the light component absorbed thereby being not greater than a predetermined maximum, said maximum being substantially equal to the density for unpolarized light of corresponding commercial isotropic color filters, a second polarizing element adapted to polarize substantially uniformly throughout the visible spectrum, means providing a common mounting for said elements, said elements being mounted in substantially parallel relation and substantially overlying each other, one of said elements being rotatably mounted with respect to the other said element, and means for rotating said rotatably mounted element.

8. A variable, color correction filter comprising, in combination, a light-polarizing element comprising a molecularly oriented sheet of a transparent, linear, high polymeric plastic the molecules of which contain hydroxyl groups, the direction of molecular orientation of one surface of said sheet being substantially perpendicular to that of the other said surface, one of said surfaces having incorporated therein a dichroic dye absorbing light of relatively short wave length to a greater extent than other light, the other of said surfaces having incorporated therein a dichroic dye absorbing light of relatively long wave length to a greater extent than other light, the density of each of said surfaces for the light component absorbed thereby being not greater than a predetermined maximum, said maximum being substantially equal to the density for unpolarized light of corresponding commercial isotropic color filters, a second polarizing element adapted to polarize substantially uniformly throughout the visible spectrum and comprising neutral dichroic material of a density substantially equal to that of the first named polarizing surfaces, means providing a common mounting for said elements, said elements being mounted in substantially parallel relation and substantially overlying each other, one of said elements being rotatably mounted with respect to the other said element, and means for rotating said rotatably mounted element.

9. A variable, color correction filter comprising, in combination, a light-polarizing element comprising a molecularly oriented sheet of a transparent, linear, high polymeric plastic the molecules of which contain hydroxyl groups, the direction of molecular orientation of one surface of said sheet being substantially perpendicular to that of the other said surface, one of said surfaces having incorporated therein a dichroic dye absorbing light of relatively short wave length to a greater extent than other light, the other of said surfaces having incorporated therein a dichroic dye absorbing light of relatively long wave length to a greater extent than other light, the density of each of said surfaces for the light component absorbed thereby being not greater than a predetermined maximum, said maximum being substantially equal to the density for unpolarized light of corresponding commercial isotropic color filters, a second polarizing element adapted to polarize substantially uniformly throughout the visible spectrum, means providing a common mounting for said elements, said elements being mounted in substantially parallel relation and substantially overlying each other, one of said elements being rotatably mounted with respect to the other said element, means for controlling the rotation of said rotatably mounted element, and scale means associated with said control means for indicating the proper setting of said filter for a given condition of illumination.

EDWIN H. LAND.